United States Patent
Lin et al.

(10) Patent No.: US 11,616,567 B2
(45) Date of Patent: Mar. 28, 2023

(54) COORDINATED SATELLITE COMMUNICATION METHOD, APPARATUS, AND SYSTEM

(71) Applicant: HUAWEI TECHNOLOGIES CO., LTD., Guangdong (CN)

(72) Inventors: Meixin Lin, Hangzhou (CN); Yunfei Qiao, Hangzhou (CN); Xian Meng, Hangzhou (CN); Dali Qin, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 78 days.

(21) Appl. No.: 17/403,953

(22) Filed: Aug. 17, 2021

(65) Prior Publication Data
US 2021/0376919 A1 Dec. 2, 2021

Related U.S. Application Data

(63) Continuation of application No. PCT/CN2020/076642, filed on Feb. 25, 2020.

(30) Foreign Application Priority Data

Feb. 27, 2019 (CN) .......................... 201910146990.2

(51) Int. Cl.
- *H04B 7/185* (2006.01)
- *H04B 7/204* (2006.01)
- *H04W 28/02* (2009.01)

(52) U.S. Cl.
CPC ..... *H04B 7/18526* (2013.01); *H04B 7/18528* (2013.01); *H04B 7/2041* (2013.01); *H04W 28/0263* (2013.01)

(58) Field of Classification Search
CPC ............ H04B 7/18526; H04B 7/18528; H04B 7/2041; H04W 28/0263; H04W 28/02;
(Continued)

(56) References Cited

U.S. PATENT DOCUMENTS 10,863,404 B2 * 12/2020 Roy ................... H04B 7/18534
2013/0077490 A1 3/2013 Sela et al.
(Continued)

FOREIGN PATENT DOCUMENTS

| CN | 1685633 A | 10/2005 |
| CN | 101001100 A | 7/2007 |

(Continued)

OTHER PUBLICATIONS

Fei Huang, Research on Access and Handoff Strategy in Low Earth Orbit Satellite Communication, University of Electronic Science and Technology, 2009, Issue 11, Abstract 3 pages.
(Continued)

*Primary Examiner* — Ashley Shivers

(57) ABSTRACT

A satellite communication method and a network device are disclosed. A first network device learns of traffics of a plurality of satellite communications link or air interface resources allocated to a plurality of satellite base stations. The first network device sends identification information to a second network device, where the identification information indicates that a traffic of a satellite communications link reaches a specified threshold, or that an air interface resource allocated by a ground station to a satellite base station reaches a specified threshold. The second network device receives an identifier message, determines a to-be-linked satellite base station that has an idle resource, and sends, to the to-be-linked satellite base station, a second message including information about a generated beam of the to-be-linked satellite base station.

16 Claims, 10 Drawing Sheets

(58) Field of Classification Search
CPC . H04W 28/0958; H04W 84/06; H04W 28/08;
H04W 28/0808; H04W 28/0831
See application file for complete search history.

(56) References Cited

U.S. PATENT DOCUMENTS

| | | |
|---|---|---|
| 2018/0062733 A1 | 3/2018 | Agarwal |
| 2019/0053116 A1 | 2/2019 | Lauer et al. |
| 2019/0260464 A1* | 8/2019 | Roy .................. H04B 7/18519 |

FOREIGN PATENT DOCUMENTS

| | | |
|---|---|---|
| CN | 103269245 A | 8/2013 |
| CN | 103905306 A | 7/2014 |
| CN | 104066120 A | 9/2014 |
| CN | 104079341 A | 10/2014 |
| CN | 106993312 A | 7/2017 |
| CN | 108540206 A | 9/2018 |
| EP | 0780997 A2 | 6/1997 |

OTHER PUBLICATIONS

Office Action issued in CN201910146990.2, dated Apr. 27, 2021, 7 pages.
Extended European Search Report issued in EP20763305.8, dated Mar. 4, 2022, 12 pages.

* cited by examiner

COORDINATED SATELLITE COMMUNICATION METHOD, APPARATUS, AND SYSTEM

CROSS-REFERENCE TO RELATED APPLICATIONS

This application is a continuation of International Application No. PCT/CN2020/076642, filed on Feb. 25, 2020, which claims priority to Chinese Patent Application No. 201910146990.2, filed on Feb. 27, 2019. The disclosures of the aforementioned applications are hereby incorporated by reference in their entireties.

TECHNICAL FIELD

Embodiments of the present invention relate to the satellite communications field, and more specifically, to a method, an apparatus, and a system for coordinated satellite communication.

BACKGROUND

In recent years, the information technology develops rapidly, and application of the technology is further affecting a development direction of the human society. An information communications network is also evolving from a fixed network to a mobile network, and from isolated ground and space networks to a space-ground integrated network. The space-ground integrated network is an important information infrastructure that extends human activities to the space, the high seas, and even the deep space. The space-ground integrated network can satisfy requirements of information technology development and transformation of economic and social development patterns, and is the emphasis, focus, and direction of development of the information technology, the information industry, the information network, and informatization.

Satellite communication is an important part of the space-ground integrated network. Standards organizations such as the 3rd Generation Partnership Project (3GPP) and the International Telecommunication Union (ITU) have successively carried out research and discussion on space-ground integrated satellite communications standards, which mainly focus on integration of existing 5G standards and satellite communications technologies, and define and analyze content such as an application scenario, a network structure, and a key technology of a 5G satellite network, to implement global coverage of the space-ground integrated network. Currently, the research has been initiated, and research on an integrated 5G-satellite architecture has been carried out. This application focuses on a coordinated satellite network technology in the integrated 5G-satellite architecture. The satellite communication has characteristics such as a long communication distance, a large coverage area, and flexible networking. In some important fields such as space communication, aeronautical communication, and military communication, the satellite communications technology plays an irreplaceable role. A satellite network can provide services for both fixed terminals and various mobile terminals.

To implement complete coverage of the earth's surface, satellite beams always evenly cover the earth's surface. However, due to population distribution, areas covered by different satellite beams differ greatly in quantities of users. FIG. 1 is a schematic diagram of satellite coverage areas. There are a large quantity of users in a densely populated land area (for example, a super-large city such as Beijing and Shanghai). For example, an area covered by a beam 104 (beam #1) of a satellite 101 has a large population density, a quantity of users of satellite communication has great potential, and communication load of the satellite 101 is very large or even exceeds a load capability. However, a sparsely populated area, for example, an area covered by a beam 104 (beam #2) of a satellite 102 or 103, has a small population density. The coverage area is an area such as a sparsely populated city, a desert area, or even an ocean. Users of satellite communication are sparsely distributed, or even there is no user. Satellite resources are not fully utilized. Consequently, satellite resources in areas with sparse users are severely wasted, while satellite resources in areas with dense users may be severely insufficient and cannot provide access services. Currently, a common solution is to modify a pilot power to adjust a coverage area of a cell. However, modifying the pilot power affects a traffic volume supported by the cell. Another solution is mobility load balancing (MLB), to be specific, adjusting a handover area by offsetting a handover cell measurement value. This method can only satisfy requirements of cell edge users and has limitations. Due to the huge difference in the quantities of users in different coverage areas, higher requirements are imposed on a coverage mode of the satellite beam.

SUMMARY

This application provides a satellite communication method and a network device, to coordinate a satellite beam to balance network load when the network load is relatively heavy, so as to improve satellite resource utilization.

The following describes this application from a plurality of aspects. It is easy to understand that implementations of the plurality of aspects may be mutually referenced.

According to an embodiment of a first aspect, this application provides a satellite communication method. The method is applied to a first network device, for example, a device with a user plane function (UPF) unit or a similar function unit. The method includes: The first network device obtains traffics of a plurality of satellite communications links, or obtain air interface resources allocated by a ground station to a plurality of satellite base stations. The first network device sends identification information to a second network device, where the identification information indicates that a traffic of a satellite communications link reaches a specified threshold, or that an air interface resource allocated by the ground station to a satellite base station reaches a specified threshold. The second network device is, for example, a device with an access and mobility management function (AMF) unit or a similar function unit.

It can be learned that the method is applied to the first network device in a coordinated satellite communications system. As an important network element in the coordinated satellite communications system, the first network device (the UPF unit or the similar unit) is a data plane function entity, and is responsible for functions such as user plane data transmission management, traffic statistics collection, and lawful interception. A network traffic of each satellite or each cell is monitored to determine traffic load of each satellite, and the identification information is used to trigger the second network device (the AMF unit or the similar unit) to schedule an idle beam resource, to indicate a surrounding satellite to allocate a resource to provide a new access and serving cell for a traffic-intensive area. According to such a method, the first network device, together with the second network device, actively schedules the idle satellite resource based on a load requirement, to balance load, and a coordinated satellite beam and a satellite of an original cell jointly provide an access service of the cell. This implements coordinated satellite communication. This method uses characteristics such as a wide adjustable range of the satellite beam and different network resource utilization statuses of different coverage cells, to fully improve network resource utilization and provide a better access service for a terminal user.

In some implementations, the identification information further indicates a cell corresponding to the satellite communications link whose traffic reaches the specified threshold, or a cell corresponding to the satellite base station whose air interface resource allocated by the ground station reaches the specified threshold. The identification information may carry an identifier (ID) of the cell or the satellite base station whose load reaches a specified threshold. In another example implementation solution, alternatively, the identifier (ID) of the cell or the satellite base station whose load reaches the specified threshold may be independently sent through a piece of identification information.

In some implementations, the method further includes: The first network device sends a first cell identifier to the second network device, where the first cell identifier is determined based on the satellite communications link whose traffic reaches the specified threshold, or is determined by the satellite base station whose air interface resource allocated by the ground station reaches the specified threshold.

In some implementations, the method further includes: The first network device sends a second cell identifier and load information to the second network device, where the second cell identifier is determined based on a satellite communications link whose traffic does not reach the specified threshold, or is determined by a satellite base station whose air interface resource allocated by the ground station does not reach the specified threshold; and the load information indicates the traffic of the satellite communications link whose traffic does not reach the specified threshold, or indicates the air interface resource allocated to the satellite base station whose air interface resource does not reach the specified threshold.

In some implementations, the method further includes: The first network device sends a second cell identifier and load information to the second network device, where the second cell identifier is determined based on a satellite ephemeris, and the load information is determined by a satellite base station corresponding to the satellite ephemeris.

In some implementations, the first network device creates a load threshold, where the load threshold is the threshold T1 that is specified for the traffic of the satellite communications link, or the threshold T2 that is specified for the air interface resource allocated to the satellite base station.

The first network device may determine, based on a pre-specified threshold, whether to trigger traffic warning information, and may further create the threshold. This allows greater flexibility for the first network device.

In some implementations, if the traffic of the satellite communications link reaches the threshold T1, the first network device sends the identification information to the second network device.

In some implementations, if the air interface resource allocated by the ground station to the satellite base station reaches the threshold T2, the first network device sends the identification information to the second network device.

According to an embodiment of a second aspect, this application provides a satellite communication method. The method is applied to a second network device, for example, a device with an access and mobility management function (AMF) unit or a similar function unit. The method includes: The second network device receives a first message sent by a first network device, where the first message includes identification information. The second network device determines a to-be-linked satellite base station based on the first message. The second network device sends a second message to the to-be-linked satellite base station, where the second message includes information about a generated beam of the to-be-linked satellite base station. The to-be-linked satellite base station has an idle satellite resource. The identification information indicates that a traffic of a satellite communications link reaches a specified threshold, or that an air interface resource allocated by a ground station to a satellite base station reaches a specified threshold. The first network device is, for example, a device with a user plane function (UPF) unit or a similar function unit.

It can be learned that the method is applied to the second network device in a coordinated satellite communications system. As an important network element in the coordinated satellite communications system, the second network device (the AMF unit or the similar unit) is a control plane function entity, and is responsible for user access management, security authentication, and mobility management. A network traffic of each satellite or each cell is monitored to determine traffic load of each satellite, the identification information is used to trigger the second network device (the AMF unit or the similar unit) to schedule an idle beam resource, and the second network device indicates a neighboring satellite to allocate a resource to provide a new access and serving cell for a traffic-intensive area. According to such a method, the second network device, together with the first network device, may actively schedule the idle satellite resource based on a load requirement, to balance load, and a coordinated satellite beam and a satellite of an original cell jointly provide an access service of the cell. This implements coordinated satellite communication. This method uses characteristics such as a wide adjustable range of the satellite beam and different network resource utilization statuses of different coverage cells, to fully improve network resource utilization and provide a better access service for a terminal user.

In some implementations, the first message further includes a second cell identifier and load information, the second cell identifier indicates a satellite base station around a satellite whose traffic reaches the specified threshold, and the load information indicates a traffic of a satellite communications link that is in the second cell identifier and whose traffic does not reach the specified threshold, or indicates an air interface resource allocated to a satellite base station that is in the second cell identifier and whose air interface resource does not reach the specified threshold.

In some implementations, the identification information further indicates a cell corresponding to the satellite communications link whose traffic reaches the specified threshold, or a cell corresponding to the satellite base station whose air interface resource allocated by the ground station reaches the specified threshold. The identification information may carry an identifier (ID) of the cell or the satellite base station whose load reaches a specified threshold. In another example implementation solution, alternatively, the identifier (ID) of the cell or the satellite base station whose load reaches the specified threshold may be independently sent through a piece of identification information.

In some implementations, the first message includes a first cell identifier, and the first cell identifier is determined based on the satellite communications link whose traffic reaches the specified threshold, or is determined by the satellite base station whose air interface resource allocated by the ground station reaches the specified threshold.

In some implementations, the second cell identifier is determined based on the satellite communications link whose traffic does not reach the specified threshold, or is determined by the satellite base station whose air interface resource allocated by the ground station does not reach the specified threshold.

In some implementations, the second cell identifier is determined based on a satellite ephemeris, and the load information is determined by a satellite base station corresponding to the satellite ephemeris.

According to an embodiment of a third aspect, this application provides a first network device, for example, a device with a user plane function (UPF) unit or a similar function unit. The first network device includes: a monitor, configured to: obtain traffics of a plurality of satellite communications links, or obtain air interface resources allocated by a ground station to a plurality of satellite base stations; and a transmitter, configured to send identification information to a second network device, where the identification information indicates that a traffic of a satellite communications link reaches a specified threshold, or that an air interface resource allocated by the ground station to a satellite base station reaches a specified threshold.

In some implementations, the identification information further indicates a cell corresponding to the satellite communications link whose traffic reaches the specified threshold, or a cell corresponding to the satellite base station whose air interface resource allocated by the ground station reaches the specified threshold.

In some implementations, the transmitter is further configured to send a first cell identifier to the second network device, where the first cell identifier is determined based on the satellite communications link whose traffic reaches the specified threshold, or is determined by the satellite base station whose air interface resource allocated by the ground station reaches the specified threshold.

In some implementations, the transmitter is further configured to send a second cell identifier and load information to the second network device, where the second cell identifier is determined based on a satellite communications link whose traffic does not reach the specified threshold, or is determined by a satellite base station whose air interface resource allocated by the ground station does not reach the specified threshold; and the load information indicates the traffic of the satellite communications link whose traffic does not reach the specified threshold, or indicates the air interface resource allocated to the satellite base station whose air interface resource does not reach the specified threshold.

In some implementations, the transmitter is further configured to send a second cell identifier and load information to the second network device, where the second cell identifier is determined based on a satellite ephemeris, and the load information is determined by a satellite base station corresponding to the satellite ephemeris.

In some implementations, the first network device further includes: a creator, configured to create a load threshold, where the load threshold is the threshold T1 that is specified for the traffic of the satellite communications link, or the threshold T2 that is specified for the air interface resource allocated to the satellite base station.

In some implementations, if the traffic of the satellite communications link reaches the threshold T1, the first network device sends the identification information to the second network device.

In some implementations, if the air interface resource allocated by the ground station to the satellite base station reaches the threshold T2, the first network device sends the identification information to the second network device.

According to an embodiment of a fourth aspect, this application provides a second network device, for example, a device with an access and mobility management function (AMF) unit or a similar function unit. The second network device includes: a receiver, configured to receive a first message sent by a first network device, where the first message includes identification information; a processor, configured to determine, by the device, a to-be-linked satellite base station based on the first message; and a transmitter, configured to send a second message to the to-be-linked satellite base station, where the second message includes information about a generated beam of the to-be-linked satellite base station. The to-be-linked satellite base station has an idle satellite resource. The identification information indicates that a traffic of a satellite communications link reaches a specified threshold, or that an air interface resource allocated by a ground station to a satellite base station reaches a specified threshold.

In some implementations, the first message further includes a second cell identifier and load information, the second cell identifier indicates a satellite base station around a satellite whose traffic reaches the specified threshold, and the load information indicates a traffic of a satellite communications link whose traffic does not reach the specified threshold, or indicates an air interface resource allocated to a satellite base station whose air interface resource does not reach the specified threshold.

In some implementations, the identification information further indicates a cell corresponding to the satellite communications link whose traffic reaches the specified threshold, or a cell corresponding to the satellite base station whose air interface resource allocated by the ground station reaches the specified threshold.

In some implementations, the first message includes a first cell identifier, and the first cell identifier is determined based on the satellite communications link whose traffic reaches the specified threshold, or is determined by the satellite base station whose air interface resource allocated by the ground station reaches the specified threshold.

In some implementations, the second cell identifier is determined based on the satellite communications link whose traffic does not reach the specified threshold, or is determined by the satellite base station whose air interface resource allocated by the ground station does not reach the specified threshold.

In some implementations, the second cell identifier is determined based on a satellite ephemeris, and the load information is determined by a satellite base station corresponding to the satellite ephemeris.

According to an embodiment of a fifth aspect, this application provides a satellite communication method. The method is applied to a second network device, for example, a device with an access and mobility management function (AMF) unit or a similar function unit. The method includes: The second network device obtains data, where the data carries population distribution information and movement track information of satellite base stations. The second network device determines a to-be-linked satellite base station and a parameter of the to-be-linked satellite base station based on the data. The second network device sends a message to the to-be-linked satellite base station, where the message includes information about a generated beam of the to-be-linked satellite base station.

It can be learned that the method is applied to the second network device in another coordinated satellite communications system. As an important network element, the second network device (the AMF unit or the similar unit) is a control plane function entity, and is responsible for user access management, security authentication, and mobility management. A network traffic of each satellite or each cell is monitored to determine traffic load of each satellite, the population distribution information and the movement track information of the satellite base stations are used to trigger the second network device (the AMF unit or the similar unit) to schedule an idle beam resource, and the second network device indicates a neighboring satellite to allocate a resource to provide a new access and serving cell for a traffic-intensive area. According to such a method, the second network device may actively schedule the idle satellite resource based on a pre-specified load requirement of each cell, to balance load, and a coordinated satellite beam and a satellite of an original cell jointly provide an access service of the cell. This implements coordinated satellite communication. The method is statically configuring the satellite cell beam based on a ground population (user) distribution status, and may be used together with the foregoing dynamic load monitoring and dynamic adjustment, to fully use satellite resources, improve resource utilization, and provide a better communication service for a user.

In some implementations, the population distribution information carries population distribution levels of different areas.

In some implementations, that the second network device determines a to-be-linked satellite base station and a parameter of the to-be-linked satellite base station based on the data specifically includes: If a population distribution level of a current cell reaches a specified threshold, the second network device determines the to-be-linked satellite base station and the parameter of the to-be-linked satellite base station based on the data.

In some implementations, the message carries information about a direction, an angle, a frequency, and a power of the generated beam.

In some implementations, the parameter of the to-be-linked satellite base station includes a movement track parameter and a communications protocol, the movement track parameter includes an azimuth angle, an elevation angle, and a polarization angle for receiving a signal of the to-be-linked satellite base station, and the communications protocol includes the frequency and the power of the transmit beam of the to-be-linked satellite base station.

According to an embodiment of a sixth aspect, this application provides a second network device, for example, a device with an access and mobility management function (AMF) unit or a similar function unit. The second network device includes: an obtainer, configured to obtain data, where the data carries population distribution information and movement track information of satellite base stations; a processor, configured to determine a to-be-linked satellite base station and a parameter of the to-be-linked satellite base station based on the data; and a transmitter, configured to send a message to the to-be-linked satellite base station, where the message includes information about a generated beam of the to-be-linked satellite base station.

In some implementations, the population distribution information carries population distribution levels of different areas.

In some implementations, if a population distribution level of a current cell reaches a specified threshold, the processor determines the to-be-linked satellite base station and the parameter of the to-be-linked satellite base station based on the data.

According to an embodiment of a seventh aspect, this application provides a coordinated satellite communications system. The satellite communications system includes a ground station, a first network device, and a second network device. The first network device is the first network device in any one of the third aspect and the implementations of the third aspect, and the second network device is the second network device in any one of the fourth aspect and the implementations of the fourth aspect. The ground station is usually a ground device that is disposed on the earth's surface (including being disposed on a ship or an airplane) to perform artificial satellite communication, and is mainly responsible for forwarding signaling and data between a satellite base station and a core network.

According to an embodiment of an eighth aspect, this application provides a computer storage medium. The computer storage medium may be non-volatile. The computer storage medium stores a computer-readable instruction. When the computer-readable instruction is executed by a processor, the method provided in any one of the foregoing implementations is implemented.

According to an embodiment of a ninth aspect, this application provides a computer program product. The computer program product includes a computer-readable instruction. When the computer-readable instruction is executed by a processor, the method provided in any one of the foregoing implementations is implemented.

According to an embodiment of a tenth aspect, this application provides a first network device, for example, a device with a user plane function (UPF) unit or a similar function unit. The first network device includes a processor and a memory. The memory is configured to store one or more computer-readable instructions (or referred to as a computer program), and the processor is configured to read the computer-readable instruction to implement the method provided in any one of the foregoing aspect related to the first network device and the implementations thereof.

In some implementations, the first network device further includes a transceiver, configured to receive and send data.

According to an embodiment of an eleventh aspect, this application provides a second network device, for example, a device with an access and mobility management function (AMF) unit or a similar function unit. The second network device includes a processor and a memory. The memory is configured to store one or more computer-readable instructions (or referred to as a computer program), and the processor is configured to read the computer-readable instruction to implement the method provided in any one of the foregoing aspect related to the second network device and the implementations thereof.

In some implementations, the second network device further includes a transceiver, configured to receive and send data.

In the embodiments of this application, according to the method for learning, by the first network device, the traffics of the satellite links or the air interface resources of the satellite base stations, or according to the method for configuring the population distribution information and/or the movement track information of the satellite base stations, when load of an original satellite network is relatively heavy, the second network device may schedule an idle satellite resource to balance the network load. This improves resource utilization.

BRIEF DESCRIPTION OF DRAWINGS

To describe the technical solutions in embodiments of the present invention more clearly, the following briefly describes the accompanying drawings used in describing the background and the embodiments. It is clear that the accompanying drawings in the following descriptions show merely some embodiments of the present invention, and a person of ordinary skill in the art may still derive other drawings or embodiments based on these drawings or descriptions without creative efforts, and the present invention aims to cover all these derived drawings or embodiments.

DESCRIPTION OF EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention, but are not intended to limit the present invention. It is clear that the described embodiments are merely some but not all of the embodiments of the present invention. All other embodiments obtained by a person of ordinary skill in the art based on the embodiments of the present invention without creative efforts shall fall within the scope of the present invention.

Figure 1:
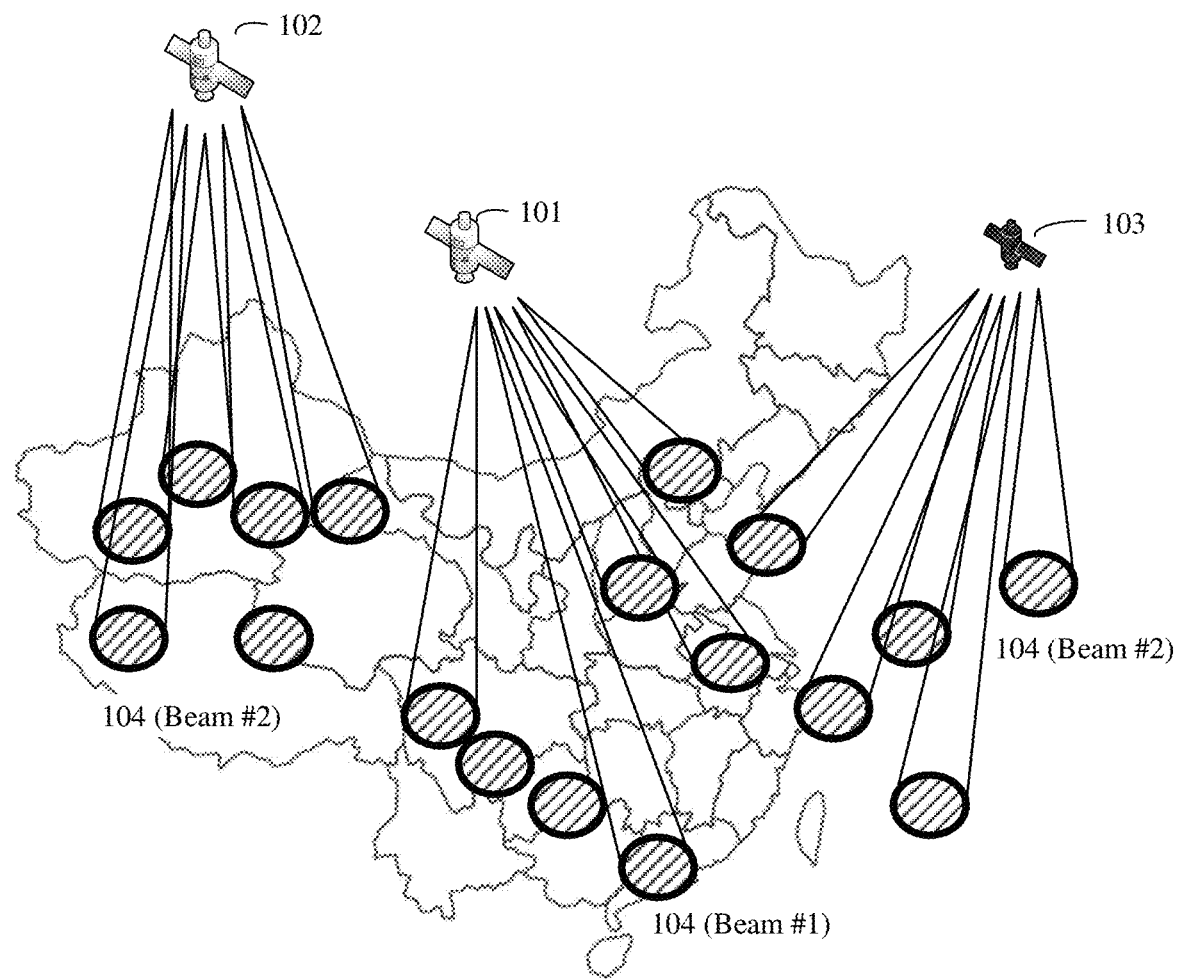
FIG. 1 is an example schematic diagram of satellite coverage areas.
Figure 2:
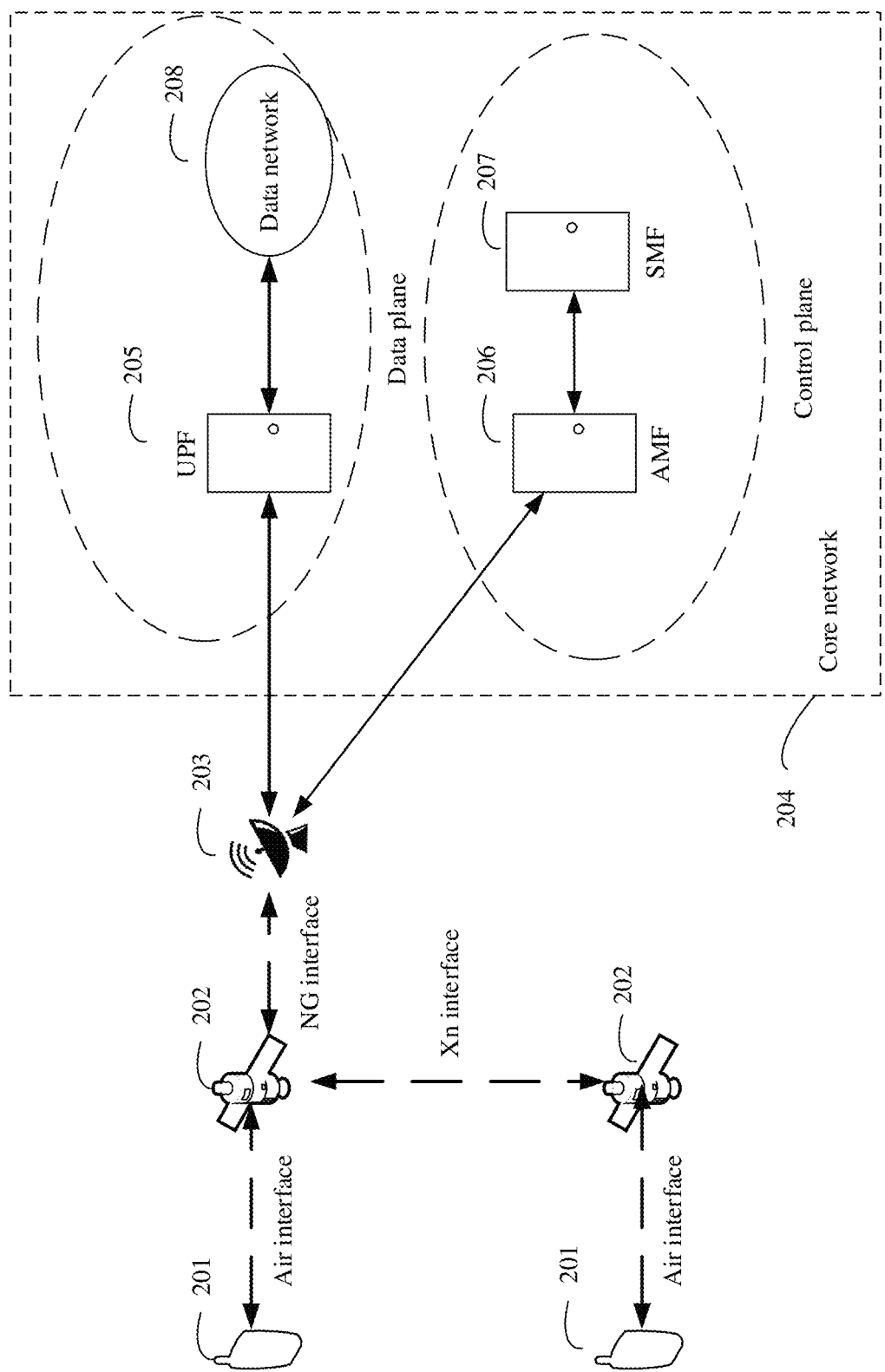
FIG. 2 is a schematic diagram of a typical network architecture of an example satellite communications system.

To better understand a network architecture and a communication method for coordinated satellite communication disclosed in the embodiments of this application, an application scenario of the embodiments of this application is first described. Referring to FIG. 2, a typical network architecture of a satellite communications system is first used as an example for description, and a network architecture for actual satellite communication is similar to this.

FIG. 2 is a schematic diagram of a typical network architecture of a satellite communications system according to an embodiment of the present disclosure. As shown in FIG. 2, the satellite communications system 200 includes a terminal device 201, satellite base stations 202, a ground station 203, a core network 204 (where the core network 204 mainly includes a user plane function (UPF) unit 205, an access and mobility management function (AMF) unit 206, a session management function (SMF) unit 207, and a data network 208). The terminal device 201 accesses a network through an air interface, to communicate with the satellite base station 202. The satellite base station 202 is connected to the ground core network 204 through a radio link (an NG interface). In addition, there is also a radio link between the satellite base stations 202, and signaling exchange and user data transmission between the satellite base stations are completed through an Xn interface. The network elements and interfaces shown in FIG. 2 are described as follows.

In this application, the terminal device 201 may be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device 201 may access a satellite network through the air interface and initiate a service such as a call or going online on the Internet, and may be a mobile device that supports a 5G new radio (NR). Typically, the terminal device 201 may be a mobile phone, a tablet computer, a portable notebook computer, a virtual/mixed/augmented reality device, a navigation device, a ground base station (for example, an eNB or a gNB), a ground station (GS), a session initiation protocol (SIP) phone, a wireless local loop (WLL) station, a personal digital assistant (PDA), a handheld device with a satellite communication function, a computing device, another processing device connected to a wireless modem, a vehicle-mounted device, a wearable device, a terminal device in a 5G network, a terminal device in a future evolved public land mobile network (PLMN) or another future communications system, or the like.

The satellite base station 202 mainly provides a radio access service for the terminal device 201, schedules a radio resource for the terminal device accessing the satellite base station, and provides a reliable radio transmission protocol, a data encryption protocol, and the like. The satellite base station is an artificial earth satellite, a high altitude aircraft, or the like that is used as a wireless communications base station, for example, an evolved base station (eNB) and a 5G base station (gNB). The satellite base station may be a geostationary earth orbit (GEO) satellite, may be a non-geostationary earth orbit (NGEO) such as a medium earth orbit (MEO) satellite or a low earth orbit (LEO) satellite, may be a high altitude platform station (HAPS), or the like.

In the embodiments of this application, the ground station 203 is mainly responsible for forwarding signaling and service data between the satellite base station 202 and the core network 204. The ground station is usually a ground device that is disposed on the earths surface (including being disposed on a ship or an airplane) to perform artificial satellite communication. The ground station mainly includes a high-gain antenna system that can trace artificial satellites, a high-power microwave transmission system, a low-noise receiving system, a power supply system, and the like.

The core network 204 is mainly used for user access control, charging, mobility management, session management, user security authentication, a supplementary service, and the like. In the embodiments of this application, the core network 204 mainly includes the user plane function unit 205, the access and mobility management function unit 206, the session management function unit 207, and the data network 208. The core network 204 includes a plurality of function units, which may be classified as control plane function entities and data plane function entities. The access and mobility management function (AMF) unit 206 is a control plane function entity, and is responsible for user access management, security authentication, and mobility management. The session management function (SMF) unit 207 is a control plane function entity, is responsible for session management, and is connected to the AMF. The user plane function (UPF) unit 205 is a data plane function entity, and is responsible for functions such as user plane data transmission management, traffic statistics collection, and lawful interception. The data network 208 is a data plane function entity, and is connected to the UPF. The core network further includes other function units, but the function units are not listed one by one.

A first network device in this application is a device with a user plane function (UPF) unit or a similar function unit.

A second network device in this application is a device with an access and mobility management function (AMF) unit or a similar function unit. To better and more clearly describe the function units, in the embodiments of this application, the user plane function (UPF) unit is used to represent the first network device, and the access and mobility management function (AMF) unit is used to represent the second network device. This representation constitutes no substantive limitation on the embodiments of this application.

User equipment and the satellite base station may implement wireless communication based on air interface technologies such as 5th generation mobile communications system new radio (5G NR), long term evolution (LTE), a global system for mobile communications (GSM), and a universal mobile telecommunications system (UMTS). The Xn interface is an interface between the satellite base stations, and is mainly used for signaling interaction such as handover. The NG interface is an interface between the satellite base station and the ground station (the core network), and is mainly used to exchange signaling such as NAS signaling of the core network, and user service data.

Figure 3:
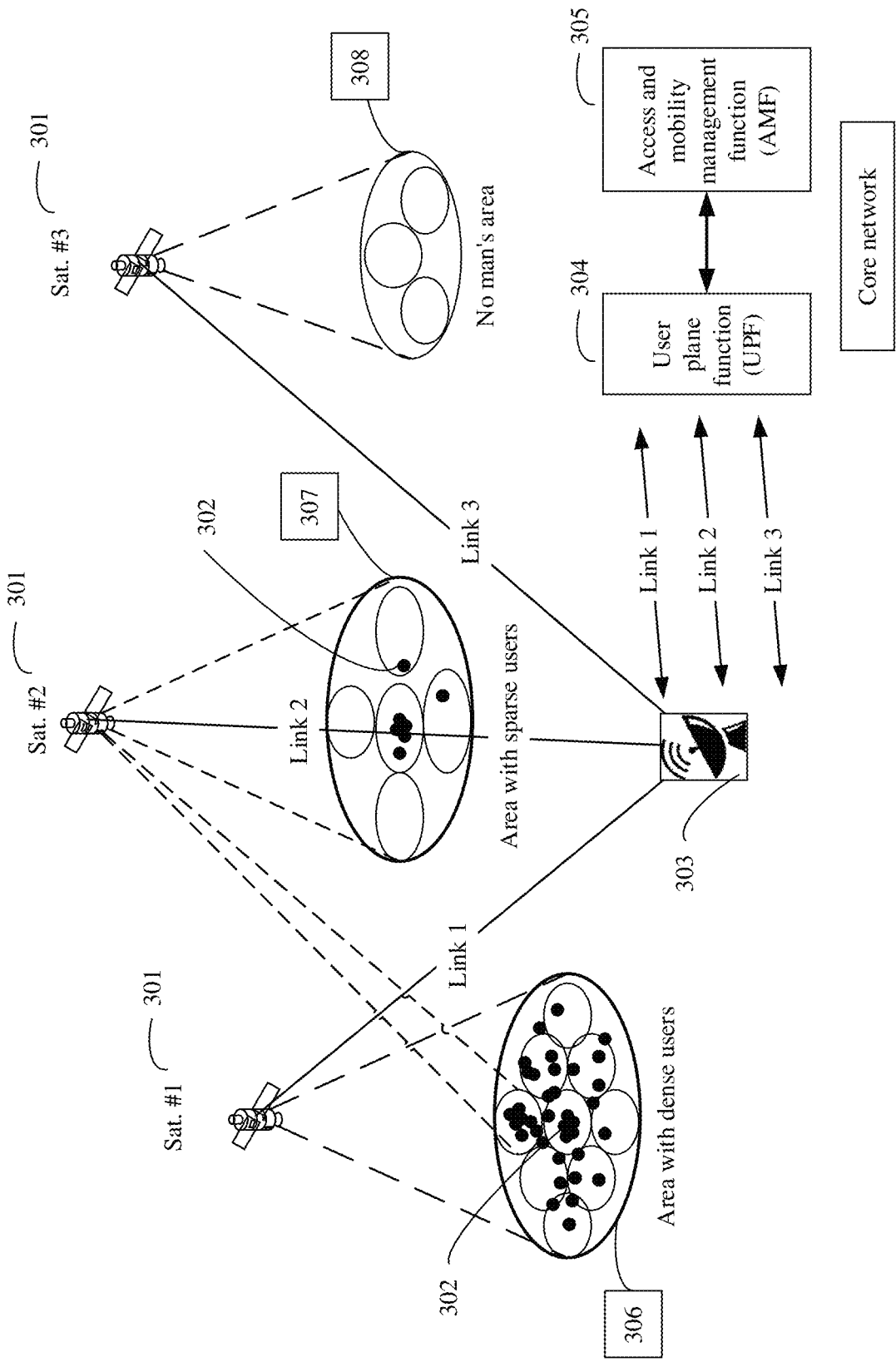
FIG. 3 is a schematic diagram of a coordinated satellite communications architecture according to an embodiment of this application.

FIG. 3 is a schematic diagram of a coordinated satellite communications architecture according to an embodiment of this application. The network architecture mainly includes satellite base stations 301 (Sat. #1, Sat. #2, and Sat. #3), terminal devices 302, a ground station 303, a user plane function (UPF) unit 304, and an access and mobility management (AMF) unit 305. In this embodiment of this application, three satellite base stations are used as examples. However, an actual quantity of satellite base stations is not limited to three, may be two or more, and may be determined based on an ephemeris and a satellite load status. A coverage area set 306 of a satellite beam of the satellite base station Sat. #1 is an area with dense users, and communication load of the satellite base station Sat. #1 is heavy. A coverage area set 307 of a satellite beam of the satellite base station Sat. #2 is an area with sparse users, and communication load of the satellite base station Sat. #2 is light. A coverage area set 308 of a satellite beam of the satellite base station Sat. #3 is a no man's area almost without users, and the satellite base station Sat. #3 basically has no communication load. A radio link established between the satellite base station Sat. #1 and the ground station 303 is denoted as a link 1. Similarly, a radio link established between the satellite base station Sat. #2 and the ground station 303 and a radio link established between the satellite base station Sat. #3 and the ground station 303 are denoted as a link 2 and a link 3 respectively. The ground station is mainly configured to forward signaling and service data between the satellite base station and a core network. The UPF is one of user plane function entities of the core network, and is responsible for data transmission and traffic statistics collection. A link established between the satellite base station Sat. #1 and the core network (UPF) is also referred to as a link 1. A link established between the satellite base station Sat. #2 and the UPF and a link established between the satellite base station Sat. #3 and the UPF are denoted as a link 2 and a link 3 respectively.

Figure 4A:
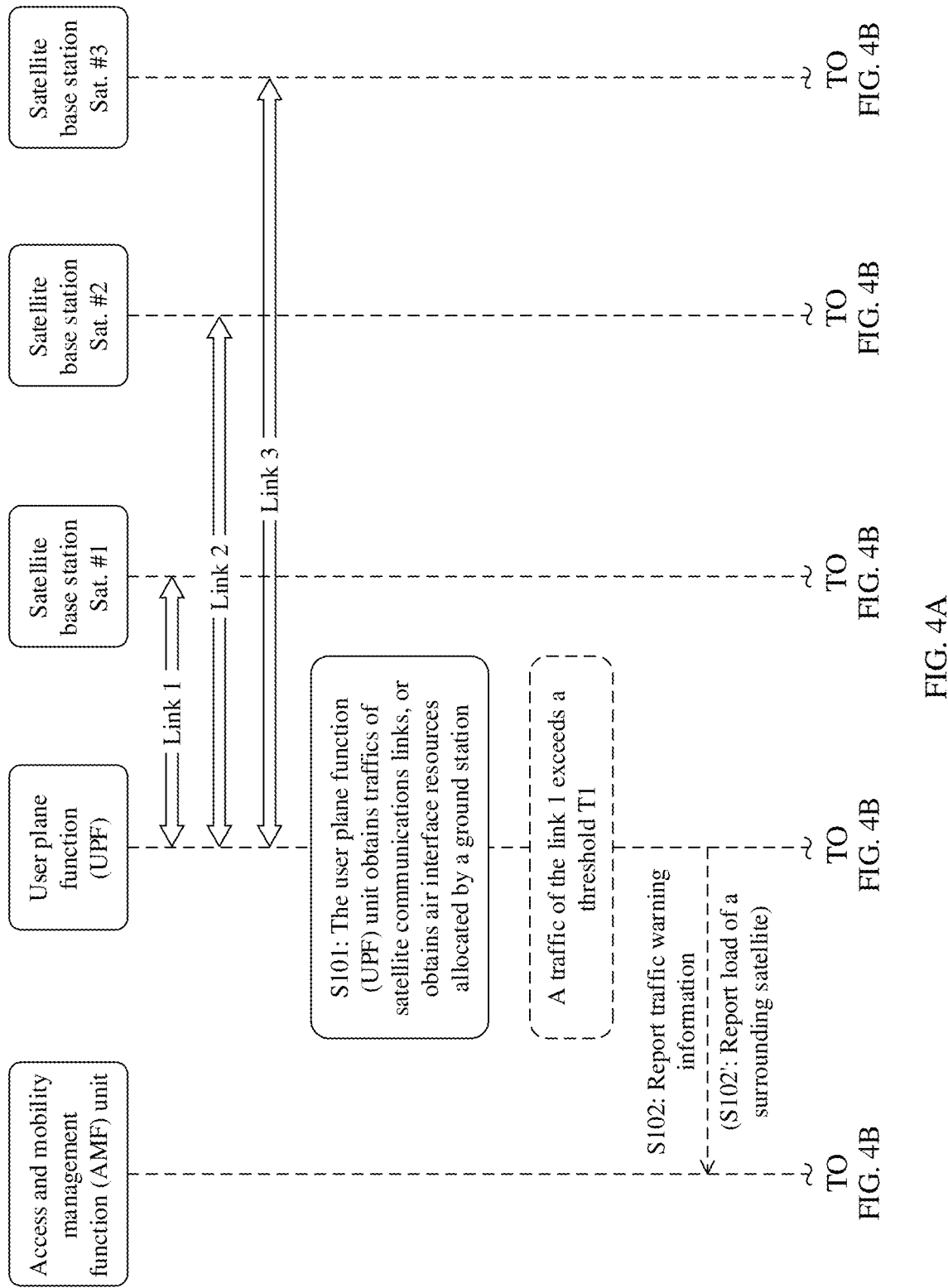
FIG. 4A and FIG. 4B are a schematic flowchart of a coordinated satellite communication method according to an embodiment of this application.
Figure 4B:
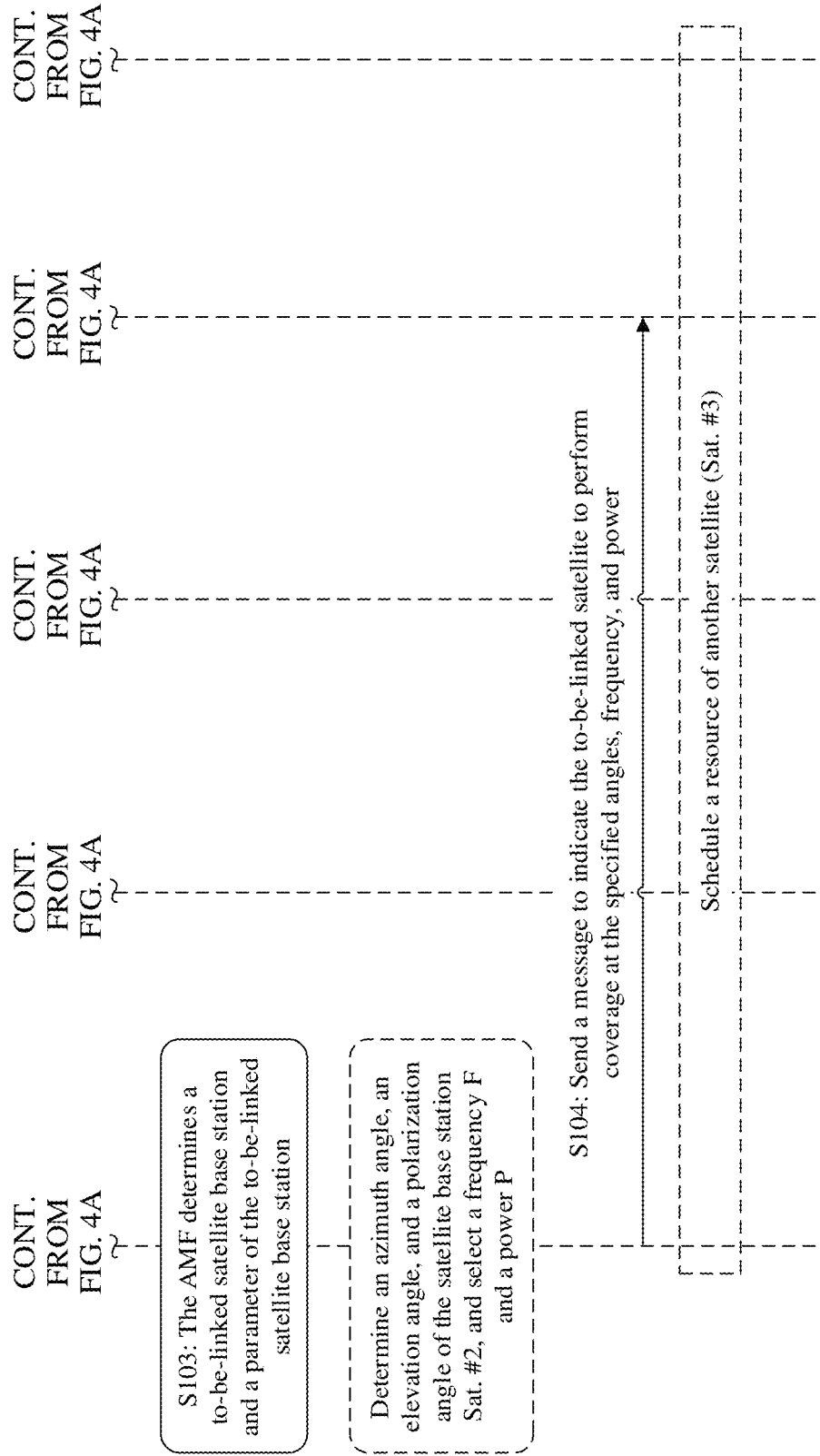

FIG. 4A and FIG. 4B are a schematic flowchart of a coordinated satellite communication method according to an embodiment of this application. The method may be used in the network architecture shown in FIG. 3. A UPF monitors a traffic between a satellite base station and a core network or an air interface resource allocated by a ground station, to determine a load status of the satellite base station. The UPF triggers, through a message, an AMF to adjust a communication resource of the satellite base station, to satisfy a communication requirement. The method includes the following steps.

S101: The user plane function (UPF) unit obtains traffics of a plurality of satellite communications links, or obtains air interface resources allocated by the ground station to a plurality of satellite base stations.

S102: The UPF sends identification information (or referred as "trigger identification information") to the access and mobility management function (AMF) unit, where the identification information indicates that a traffic of a satellite communications link reaches a specified threshold, or that an air interface resource allocated by the ground station to a satellite base station reaches a specified threshold.

S102': The UPF sends a first message including the identification information to the access and mobility management function (AMF) unit, where the first message includes the identification information, a second cell identifier, and load information.

S103: The AMF determines a to-be-linked satellite base station and a parameter of the to-be-linked satellite base station based on the first message.

S104: The AMF sends a second message to the to-be-linked satellite base station, where the second message includes information about a generated beam of the to-be-linked satellite base station.

The parameter includes movement track information and communications protocol information. The movement track information includes an azimuth angle, an elevation angle, and a polarization angle of the to-be-linked satellite; and the communications protocol information includes a communication frequency and a communication power.

The information includes a direction, an angle, a frequency, and a power of the generated beam of the to-be-linked satellite base station.

In step 101, specifically, the satellite communications links may be radio links between the satellite base stations and the ground station, may be communications links that are between the ground station and the user plane function (UPF) unit and that reflect the data traffics of the satellite base stations, or may be communications links between the satellite base stations and the core network. The traffic reflects load of each satellite base station.

Specifically, an air interface resource of the ground station is a frequency resource that can be allocated by the ground station to each satellite base station, and a load status of each satellite base station can be reflected by using the allocated air interface resource.

For example, in the network architecture shown in FIG. 3, the UPF of the ground core network separately collects statistics on traffics of the link 1, the link 2, and the link 3 between the three satellite base stations (Sat. #1, Sat. #2, and Sat. #3) and the core network, to calculate a traffic 1, a traffic 2, and a traffic 3 in a pre-specified time interval, so as to determine load statuses of the three satellite base stations (Sat. #1, Sat. #2, and Sat. #3) based on the traffics in the pre-specified time interval. Alternatively, the UPF monitors air interface resources allocated by the ground station to the three satellite base stations, to determine load of each of the three satellite base stations (Sat. #1, Sat. #2, and Sat. #3).

In step 102, optionally, the trigger identification information (or identification information) further indicates a cell corresponding to the satellite communications link whose traffic reaches the specified threshold, or a cell corresponding to the satellite base station whose air interface resource allocated by the ground station reaches the specified threshold. The trigger identification information may carry an identifier (ID) of the cell or the satellite base station whose load reaches a specified threshold. In another example implementation solution, alternatively, the identifier (ID) of the cell or the satellite base station whose load reaches the specified threshold may be independently sent through a kind of identification information.

Optionally, the UPF sends a first cell identifier to the AMF, where the first cell identifier is determined based on the satellite communications link whose traffic reaches the specified threshold, or is determined by the satellite base station whose air interface resource allocated by the ground station reaches the specified threshold.

Optionally, the UPF preconfigures a load threshold, where the load threshold may be the specified threshold T1 of the traffic of the satellite link, or may be the specified threshold T2 of the air interface resource allocated by the ground station to each satellite. Optionally, the UPF creates a load threshold, where the load threshold is the threshold T1 that is specified for the traffic of the satellite communications link, or the threshold T2 that is specified for the air interface resource allocated to the satellite base station.

Further, if the traffic of the satellite communications link reaches the threshold T1, the UPF sends the trigger identification information to the AMF.

Further, if the air interface resource allocated by the ground station to the satellite base station reaches the threshold T2, the UPF sends the trigger identification information to the AMF.

In addition to determining, based on the pre-specified threshold, whether to trigger traffic warning information, the UPF may further create the threshold. This allows greater flexibility for the UPF.

Because the UPF monitors the traffics of the satellite communications links or the air interface resources allocated by the ground station, when the UPF detects that the traffic or the allocated air interface resource reaches the specified threshold, the UPF sends, to the AMF in a form of signaling, an identifier indicating that the specified threshold is reached. The signaling further includes a cell identifier (ID) corresponding to the traffic or the allocated air interface resource that reaches the specified threshold, and a traffic or an air interface resource allocation status of another link.

For example, in the network architecture shown in FIG. 3, the traffic of the link 1 exceeds the specified threshold T1 from a moment, the UPF detects this event, and the UPF sends information to the AMF. The information may include an identifier indicating that the traffic of the link link 1 reaches the specified threshold, a cell identifier (ID) corresponding to the link, and the traffics or air interface resource allocation statuses of the other links.

In step 102', the AMF further needs to determine a to-be-scheduled satellite beam based on a surrounding satellite resource in addition to the trigger identification information. Therefore, an ID and load information of the surrounding satellite resource are need.

Optionally, the first message further includes the second cell identifier and the load information, the second cell identifier indicates a satellite base station around a satellite whose traffic reaches the specified threshold, and the load information indicates a traffic of a satellite communications link that is in the second cell identifier and whose traffic does not reach the specified threshold, or indicates an air interface resource allocated to a satellite base station that is in the second cell identifier and whose air interface resource does not reach the specified threshold.

Specifically, the second cell identifier is determined based on the satellite communications link whose traffic does not reach the specified threshold, or is determined by the satellite base station whose air interface resource allocated by the ground station does not reach the specified threshold. Optionally, the second cell identifier is determined based on a satellite ephemeris, and the load information is determined by a satellite base station corresponding to the satellite ephemeris.

In step 103, the parameter that needs to be determined includes the azimuth angle, the elevation angle, and the polarization angle of the to-be-linked satellite, where the azimuth angle, the elevation angle, and the polarization angle of the to-be-linked satellite are an azimuth angle, an elevation angle, and a polarization angle of an antenna that receives a signal of the to-be-linked satellite.

Optionally, the AMF selects, as the to-be-linked satellite base station based on the satellite ephemeris, a satellite near the satellite base station whose traffic or allocated air interface resource reaches the specified threshold.

For example, in the network architecture shown in FIG. 3, the traffic of the link link 1 exceeds the specified threshold T1, and the link link 1 corresponds to the satellite base station Sat. #1. The AMF selects, based on the satellite ephemeris, the satellite base station Sat. #2 that is relatively close to the satellite base station Sat. #1 at the moment, as the to-be-linked satellite base station that assists in balancing communication load of the satellite base station Sat. #1. The cell 307 covered by the beam of the satellite base station Sat. #2 is an area with sparse users, and the satellite base station Sat. #2 still has a redundant communication capability to bear more communication load. The AMF determines movement track information and communications protocol information of the satellite base station Sat. #2. The movement track information includes an azimuth angle, an elevation angle, and a polarization angle of the satellite base station Sat. #2. The communications protocol information includes information such as a frequency and a power of a satellite beam allocated by the satellite base station Sat. #2 to the cell 306. Optionally, in some cases, the AMF may also select the satellite base station Sat. #3 as the to-be-linked satellite base station that assists in balancing the communication load of the satellite base station Sat. #1.

After step 104, optionally, the to-be-linked satellite base station generates the beam to cover a specified area (a heavy-load cell), and accepts access of a terminal device in the specified area.

For example, in the network architecture shown in FIG. 3, the AMF sends information to the satellite base station Sat. #2 through the ground station, to indicate the satellite base station Sat. #2 to generate a beam to cover a specified area (an area in the cell 306), and accept access of a terminal device in the area in the cell 306. The information includes a direction and an angle of the generated beam of the satellite base station Sat. #2, a satellite communication frequency and power, and the like. Optionally, if the AMF selects the satellite base station Sat. #3 as the to-be-linked satellite base station that assists in balancing the communication load of the satellite base station Sat. #1, the AMF sends information to the satellite base station Sat. #3 through the ground station, to indicate the satellite base station Sat. #3 to generate a beam to cover a specified area (an area in the cell 306).

In another case, if the generated beam of the to-be-linked satellite base station still cannot satisfy the communication requirement of the cell, and the traffic of the satellite base station that originally covers the cell or the air interface resource allocated by the ground station to the satellite base station still reaches the specified threshold, the AMF may be triggered by a message again to allocate another satellite beam to assist the terminal device in the cell in accessing.

In this application, monitoring the traffic or the air interface resource means obtaining a status or information of the traffic or the allocated air interface resource. The two expressions may be interchanged, and this does not constitute an actual limitation on the solutions in the embodiments of this application.

This embodiment provides the network architecture and the communication method for coordinated satellite communication. The user plane function (UPF) unit monitors the traffics of the satellite communications links or the air interface resources allocated by the ground station. The UPF sends, to the access and mobility management function (AMF) unit, the information including the identifier indicating that the load reaches the threshold and the load status of the surrounding satellite. The AMF determines the to-be-linked satellite base station and the parameter of the to-be-linked satellite base station, and sends the information to the to-be-linked satellite base station. The to-be-linked satellite base station generates the beam to cover the specified area (the heavy-load cell), and accepts the access of the terminal device in the specified area. According to the network architecture and the communication method for coordinated satellite communication provided in this embodiment, the UPF monitors the traffic between the satellite base station and the core network or the air interface resource allocated by the ground station, to determine the load status of the satellite base station. The UPF triggers, through the message, the AMF to adjust the communication resource of the satellite base station, to satisfy the communication requirement. This solution uses characteristics such as a wide adjustable range of the satellite beam and different network resource utilization statuses of different coverage cells, to improve network resource utilization and provide a better access service for a terminal user.

Figure 5:
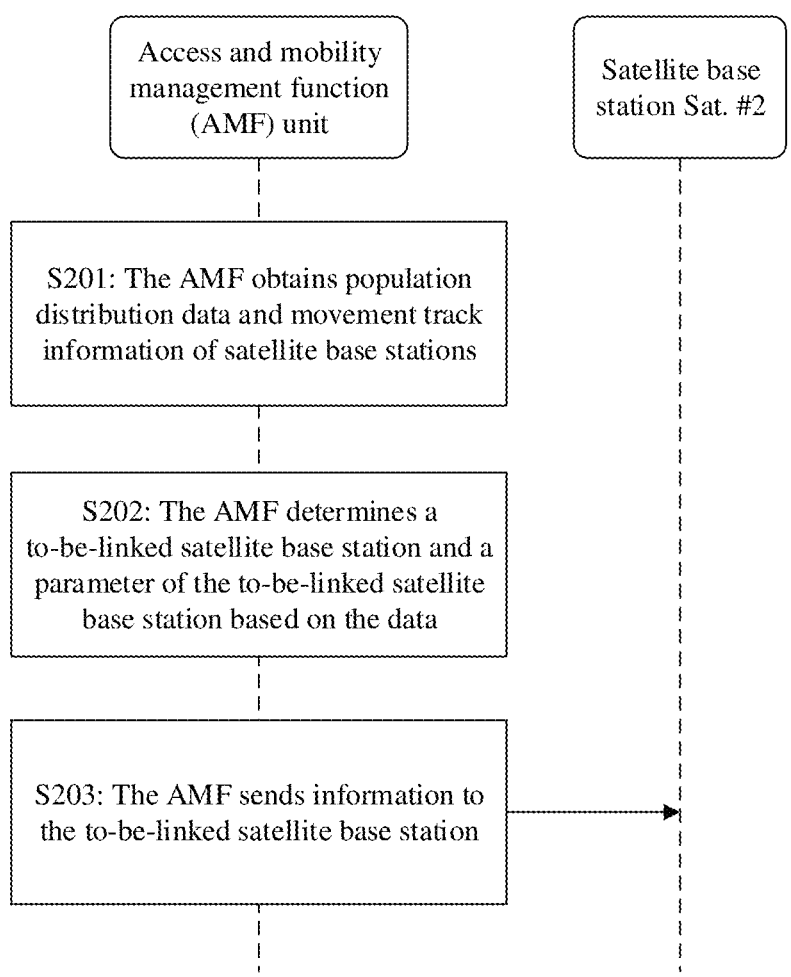
FIG. 5 is a schematic flowchart of another coordinated satellite communication method according to an embodiment of this application.

FIG. 5 is a schematic flowchart of another coordinated satellite communication method according to an embodiment of this application. As shown in FIG. 5, the method mainly relates to a satellite base station, a terminal device, and an access and mobility management function (AMF) unit. The AMF schedules, based on a population density and movement tracks of satellite base stations, a satellite around a heavy-load satellite base station to balance load. The method includes the following steps.

S201: The AMF obtains data, where the data carries population distribution information and movement track information of the satellite base stations.

S202: The AMF determines a to-be-linked satellite base station and a parameter of the to-be-linked satellite base station based on the data.

S203: The AMF sends a message to the to-be-linked satellite base station, where the message includes information about a generated beam of the to-be-linked satellite base station.

Optionally, the population distribution information may be a population distribution density table shown in Table 1 or may be in another form with a same effect. Levels are determined based on population distribution statuses in different geographical locations. Further, the population distribution information carries population distribution levels of different areas. In step S202, if a population distribution level of a current cell reaches a specified threshold, the AMF determines the to-be-linked satellite base station and the parameter of the to-be-linked satellite base station based on the data.

Optionally, the parameter of the to-be-linked satellite base station includes a movement track parameter and a communications protocol, the movement track parameter includes an azimuth angle, an elevation angle, and a polarization angle for receiving a signal of the to-be-linked satellite base station, and the communications protocol includes a frequency and a power of the transmit beam of the to-be-linked satellite base station. From a specific implementation perspective, a movement track of the satellite is fixed, location information of the satellite at any moment may be obtained through calculation. Therefore, the movement track parameter of the satellite may be obtained through calculation, or may be obtained by querying an ephemeris.

Optionally, the message carries information about a direction, an angle, the frequency, and the power of the generated beam.

For example, ground areas may be classified into different levels such as A, B, C, and D, which correspond to population distribution densities: ≤100 people per square kilometer, ≤1,000 people per square kilometer, ≤50,000 people per square kilometer, ≤100,000 people per square kilometer, and the like. The population distribution density table is generated based on the foregoing level division and is stored in a network element node (for example, the AMF) of a core network. Alternatively, the ground areas may be directly classified based on each square kilometer, and the different ground areas are classified into population levels based on a population distribution density in each square kilometer.

Figure 6:
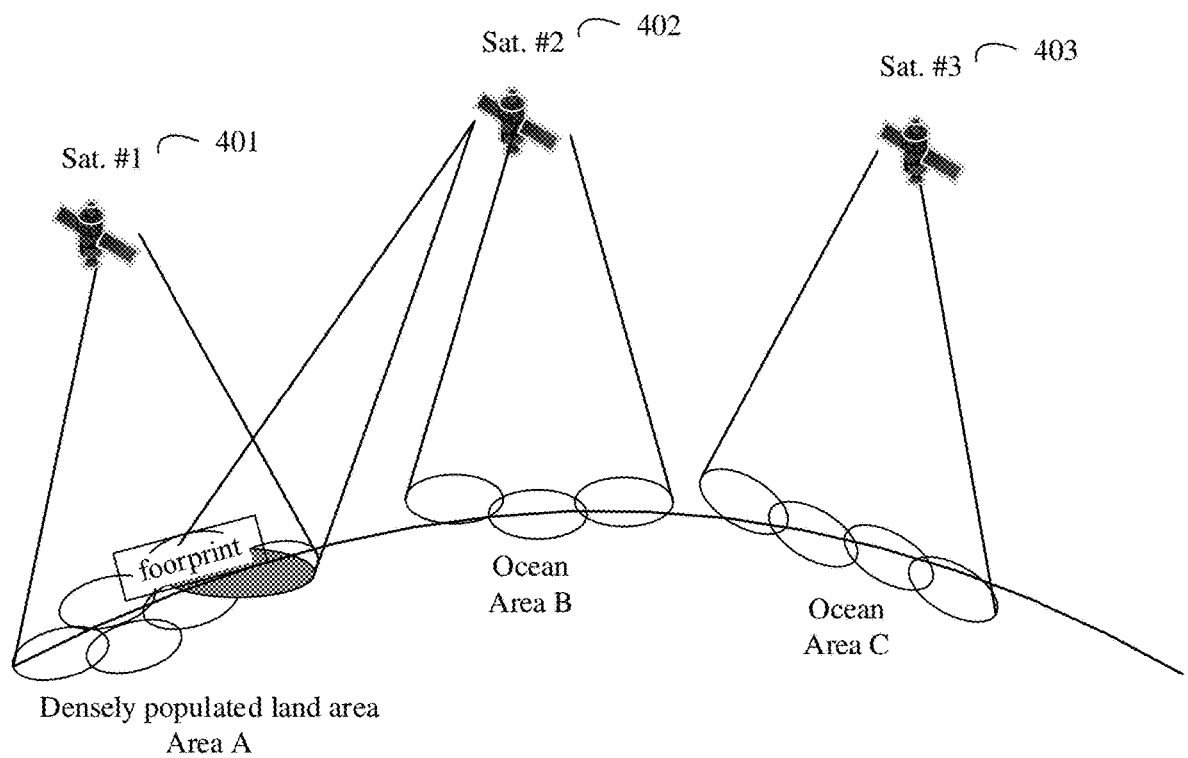
FIG. 6 is a schematic diagram of adjusting a satellite beam based on a population distribution density table according to an embodiment of this application.

FIG. 6 is a schematic diagram of adjusting a satellite beam based on a population distribution density table according to an embodiment of this application. FIG. 6 corresponds to Table 1. As shown in FIG. 6, an area A is a densely populated land area, for example, a geographical area of a large city such as Beijing, and a population distribution level of the area A is S; an area B is an area near an ocean, for example, a geographical area of a coastal city such as Qingdao, and a population distribution level of the area B is B; and an area C is a marine area, for example, a geographical area of an ocean area such as the Yellow Sea, and a population distribution level of the area C is A. At a moment T1 shown in FIG. 6, a satellite beam of a satellite base station 401 (Sat. #1) covers the area A. Because the area A is a densely populated area, communication load of the satellite base station 401 (Sat. #1) is heavy, and a terminal user in the area A may not access a satellite network. A satellite beam of a satellite base station 401 (Sat. #2) covers the area B, the area B is a sparsely populated area, and communication load of the satellite base station 401 (Sat. #2) is light. In addition, the satellite base station 401 (Sat. #2) is close to the satellite base station 401 (Sat. #1), and the beam of the satellite base station 401 (Sat. #2) may cover a part or all of the area A. The satellite base station 401 (Sat. #2) generates, based on the information sent by the AMF, a beam to cover the part or all of the area A. Information such as a quantity of beams, a frequency and a power of the beam, and an angle of a satellite antenna is determined based on the information sent by the AMF. A terminal device in an area covered by both the satellite base station 401 (Sat. #1) and the satellite base station (Sat. #2) may access the satellite base station 401 (Sat. #1) or the satellite base station 401 (Sat. #2) based on a normal process.

Optionally, before the moment T1, the AMF sends the information to the light-load satellite base station 401 (Sat. #2).

TABLE 1

Population distribution density table

| Geographical location | Population distribution level |
|---|---|
| Area A | S |
| Area B | B |
| Area C | A |
| ... | ... |

This embodiment provides the coordinated satellite communication method. The access and mobility management function (AMF) unit obtains the population distribution data and the movement track information of the satellite base stations. At a moment, the AMF sends the information to the to-be-linked satellite base station, where the information indicates the quantity of beams to be established by the to-be-linked satellite base station, the frequency and the power of the beam, the angle of the antenna, and the like. According to the coordinated satellite communication method provided in this embodiment, the satellite beam is coordinated based on the population distribution data, and beam coverage is performed on the densely populated area by scheduling an idle resource. This improves resource utilization of the satellite base station, optimizes configuration of satellite resources, and provides higher access capacity for the densely populated area, to satisfy a communication requirement of users in the densely populated area.

Figure 7:
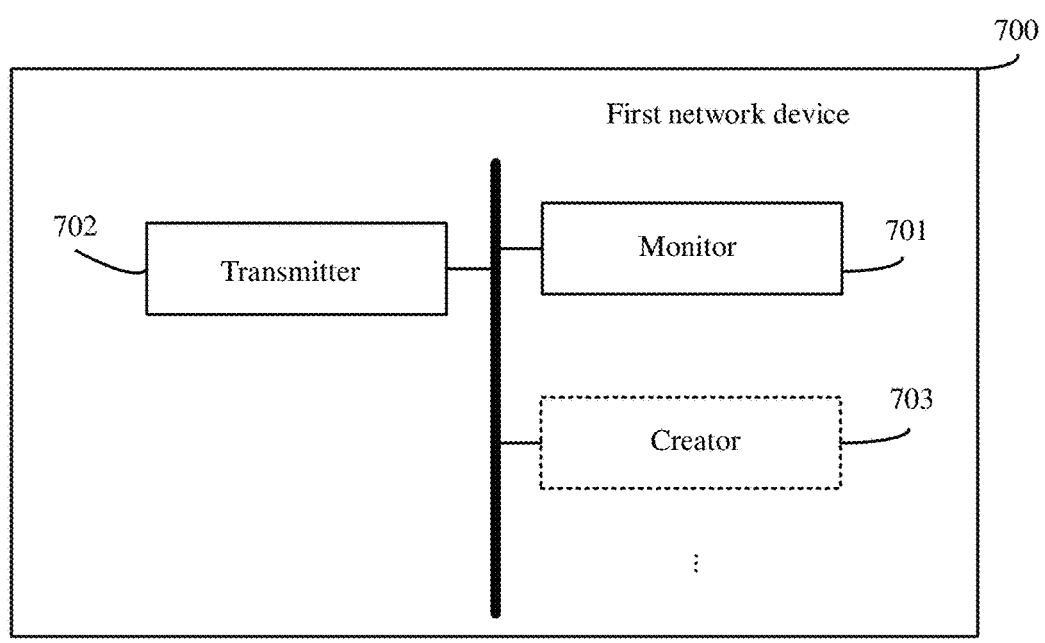
FIG. 7 is a schematic structural diagram of a first network device 700 according to an embodiment of this application.

FIG. 7 is a schematic structural diagram of a first network device 700 according to an embodiment of this application, for example, a device with a user plane function (UPF) unit or a similar function unit. As shown in FIG. 7, the first network device 700 includes:

a monitor 701, configured to: monitor traffics of a plurality of satellite communications links, or monitor air interface resources allocated by a ground station to a plurality of satellite base stations; and a transmitter 702, configured to send trigger identification information to a second network device, where the trigger identification information indicates that a traffic of a satellite communications link reaches a specified threshold, or that an air interface resource allocated by the ground station to a satellite base station reaches a specified threshold.

In some implementations, the trigger identification information further indicates a cell corresponding to the satellite communications link whose traffic reaches the specified threshold, or a cell corresponding to the satellite base station whose air interface resource allocated by the ground station reaches the specified threshold.

Specifically, the second network device may be a device with an access and mobility management function (AMF) unit or a similar function unit.

Optionally, the transmitter 702 is further configured to send a first cell identifier to the second network device, where the first cell identifier is determined based on the satellite communications link whose traffic reaches the specified threshold, or is determined by the satellite base station whose air interface resource allocated by the ground station reaches the specified threshold.

Optionally, the transmitter 702 is further configured to send a second cell identifier and load information to the second network device, where the second cell identifier is determined based on a satellite communications link whose traffic does not reach the specified threshold, or is determined by a satellite base station whose air interface resource allocated by the ground station does not reach the specified threshold; and the load information indicates the traffic of the satellite communications link whose traffic does not reach the specified threshold, or indicates the air interface resource allocated to the satellite base station whose air interface resource does not reach the specified threshold.

Optionally, the transmitter 702 is further configured to send a second cell identifier and load information to the second network device, where the second cell identifier is determined based on a satellite ephemeris, and the load information is determined by a satellite base station corresponding to the satellite ephemeris.

Optionally, the first network device further includes: a creator 703, configured to create a load threshold, where the load threshold is the threshold T1 that is specified for the traffic of the satellite communications link, or the threshold T2 that is specified for the air interface resource allocated to the satellite base station.

Optionally, if the traffic of the satellite communications link reaches the threshold T1, the first network device sends the trigger identification information to the second network device.

Optionally, if the air interface resource allocated by the ground station to the satellite base station reaches the threshold T2, the first network device sends the identification information to the second network device.

Figure 8:
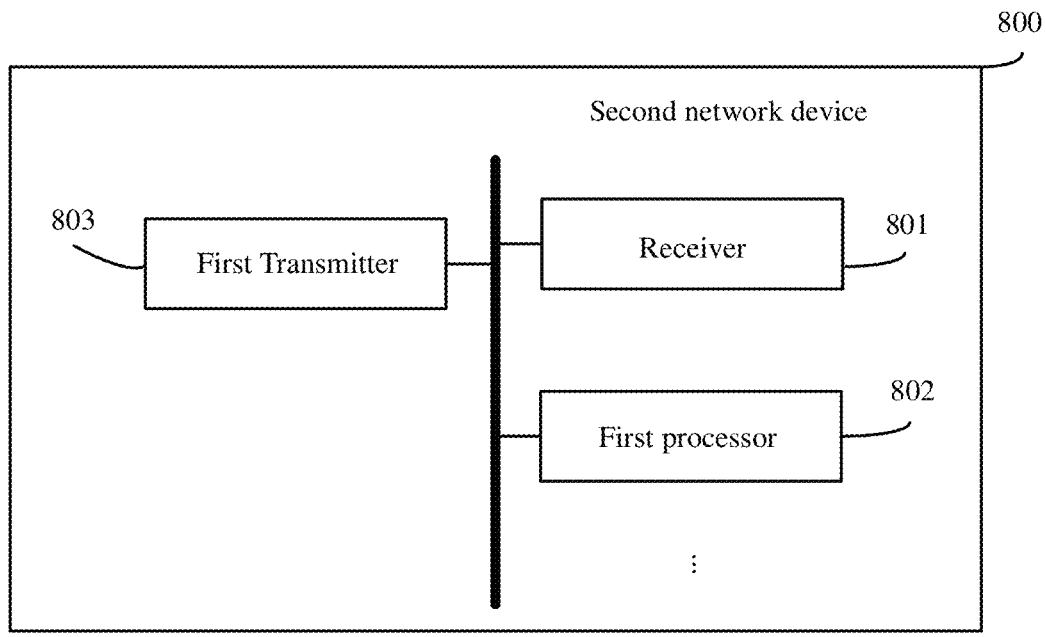
FIG. 8 is a schematic structural diagram of a second network device 800 according to an embodiment of this application.

FIG. 8 is a schematic structural diagram of a second network device 800 according to an embodiment of this application, for example, a device with an access and mobility management function (AMF) unit or a similar function unit. As shown in FIG. 8, the second network device 800 includes:

a receiver 801, configured to receive a first message sent by a first network device, where the first message includes trigger identification information, a second cell identifier, and load information;

a first processor 802, configured to determine, by the device, a to-be-linked satellite base station and a parameter of the to-be-linked satellite base station based on the first message; and a first transmitter 803, configured to send a second message to the to-be-linked satellite base station, where the second message includes information about a generated beam of the to-be-linked satellite base station.

The trigger identification information indicates that a traffic of a satellite communications link reaches a specified threshold, or an air interface resource allocated by a ground station to a satellite base station reaches a specified threshold; and the load information indicates a traffic of a satellite communications link whose traffic does not reach the specified threshold, or indicates an air interface resource allocated to a satellite base station whose air interface resource does not reach the specified threshold.

Optionally, the trigger identification information further indicates a cell corresponding to the satellite communications link whose traffic reaches the specified threshold, or a cell corresponding to the satellite base station whose air interface resource allocated by the ground station reaches the specified threshold.

Optionally, the first message includes a first cell identifier, and the first cell identifier is determined based on the satellite communications link whose traffic reaches the specified threshold, or is determined by the satellite base station whose air interface resource allocated by the ground station reaches the specified threshold.

Optionally, the second cell identifier is determined based on the satellite communications link whose traffic does not reach the specified threshold, or is determined by the satellite base station whose air interface resource allocated by the ground station does not reach the specified threshold.

Optionally, the second cell identifier is determined based on a satellite ephemeris, and the load information is determined by a satellite base station corresponding to the satellite ephemeris.

Figure 9:
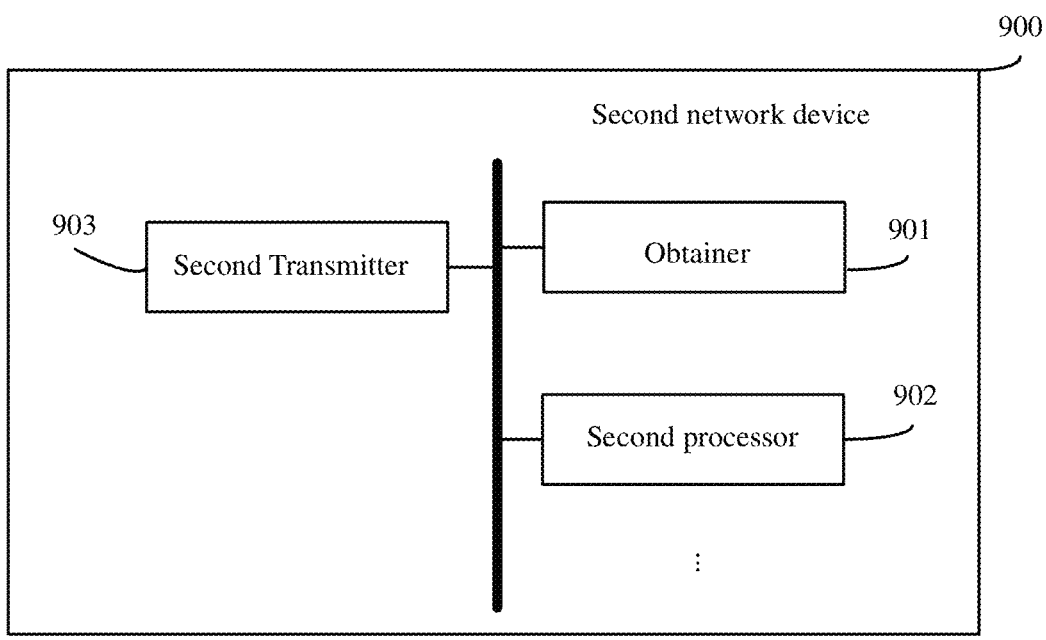
FIG. 9 is a schematic structural diagram of another second network device 900 according to an embodiment of this application.

FIG. 9 is a schematic structural diagram of a second network device 900 according to an embodiment of this application, for example, a device with an access and mobility management function (AMF) unit or a similar function unit. As shown in FIG. 9, the second network device 900 includes:

an obtainer 901, configured to obtain data, where the data carries population distribution information and movement track information of satellite base stations;

a second processor 902, configured to determine a to-be-linked satellite base station and a parameter of the to-be-linked satellite base station based on the data; and a second transmitter 903, configured to send a message to the to-be-linked satellite base station, where the message includes information about a generated beam of the to-be-linked satellite base station.

Optionally, the population distribution information carries population distribution levels of different areas.

Optionally, if a population distribution level of a current cell reaches a specified threshold, the second processor determines the to-be-linked satellite base station and the parameter of the to-be-linked satellite base station based on the data.

In the embodiments of this application, some units (or components) of the first network device or the second network device may be implemented by using a hardware circuit, and some other units (or components) are implemented by using software, or all units (or components) may be implemented by using a hardware circuit, or all units (or components) are implemented by using software.

Figure 10:
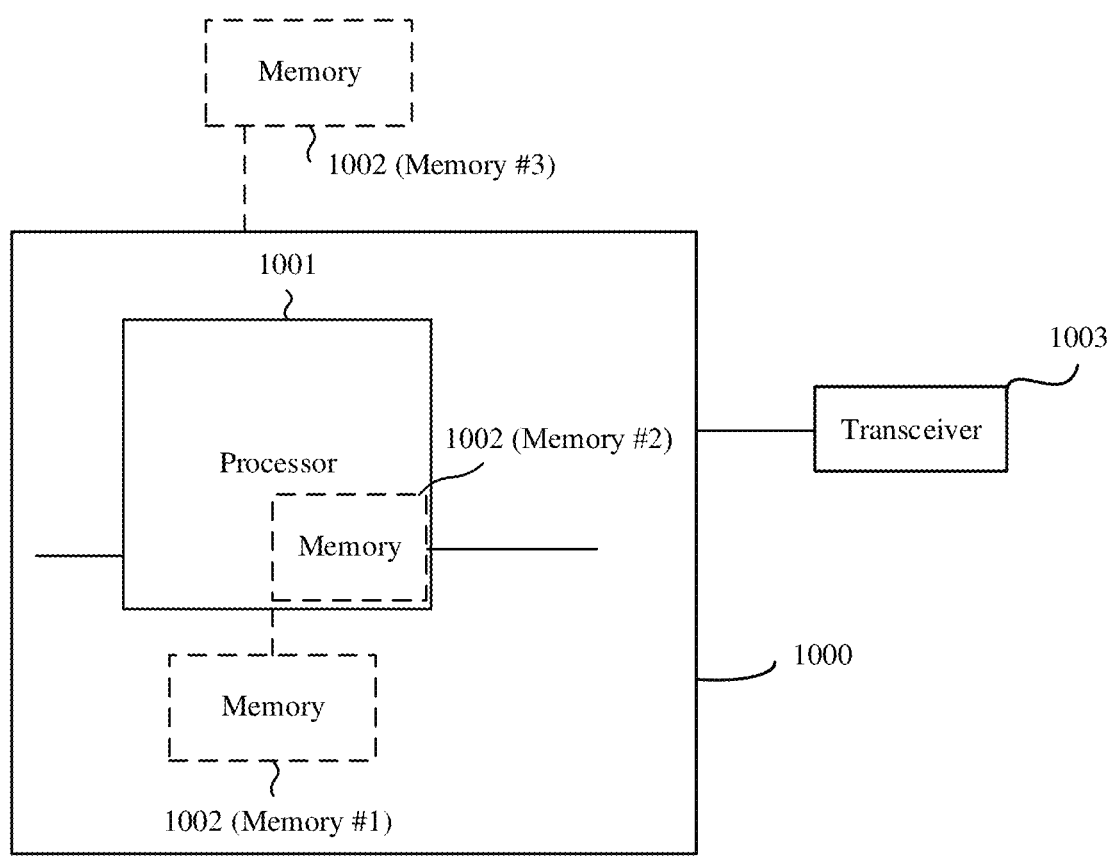
FIG. 10 is a schematic structural diagram of a first network device 1000 according to an embodiment of this application.

FIG. 10 is a schematic structural diagram of a first network device 1000 according to an embodiment of this application. As shown in FIG. 10, the first network device 1000 is, for example, a device with a user plane function (UPF) unit or a similar function unit. The first network device 1000 includes a processor 1001 and a memory 1002. The memory 1002 may be a memory (memory #3) independent of the processor or the network device, or may be a memory (memory #1 or memory #2) inside the processor or the network device. The memory 1002 may be a physically independent unit, or may be storage space, a network hard disk, or the like on a cloud server.

The memory 1002 is configured to store one or more computer-readable instructions (or referred to as a computer program).

The processor 1001 is configured to read the one or more computer-readable instructions to implement the method provided in any one of the foregoing aspects related to the first network device and the implementations thereof.

Optionally, the memory 1002 (memory #1) is located in the apparatus.

Optionally, the memory 1002 (memory #2) is integrated with the processor.

Optionally, the memory 1002 (memory #3) is located outside the apparatus.

Optionally, the first network device further includes a transceiver 1003, configured to receive and send data.

Figure 11:
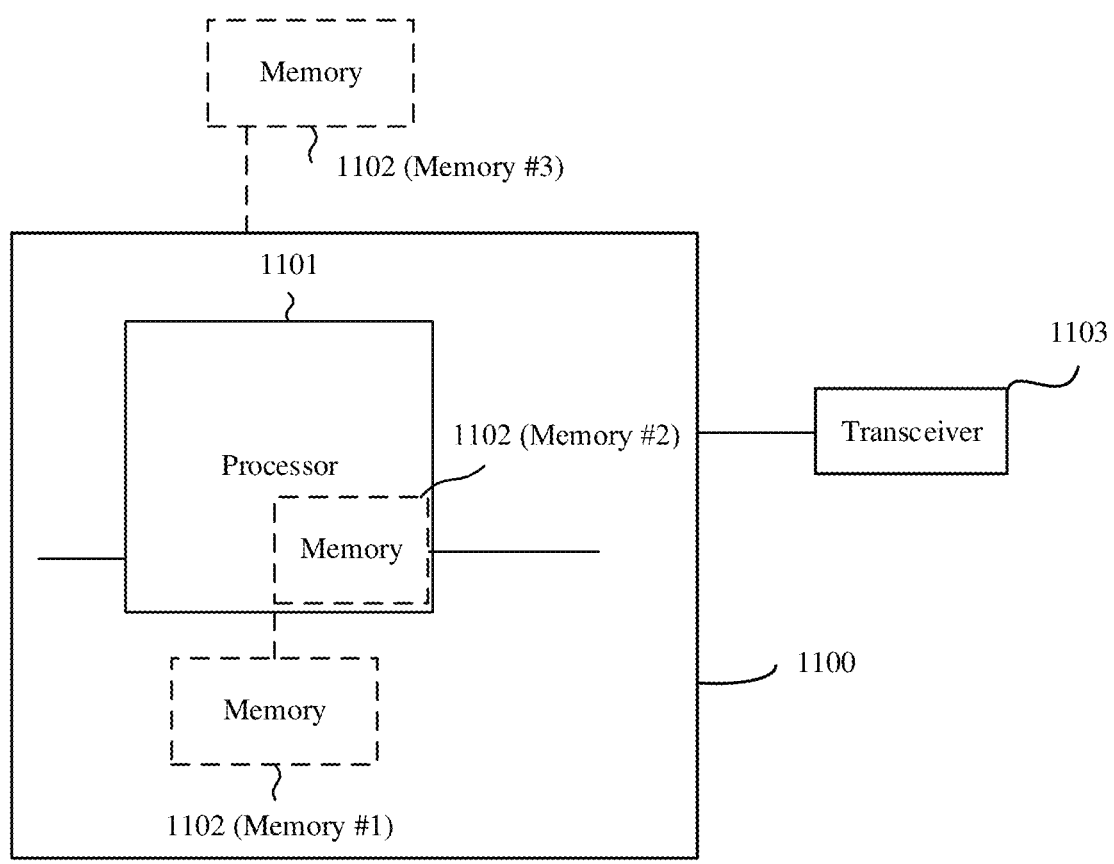
FIG. 11 is a schematic structural diagram of a second network device 1100 according to an embodiment of this application.

FIG. 11 is a schematic structural diagram of a second network device 1100 according to an embodiment of this application. As shown in FIG. 11, the second network device 1100 is, for example, a device with an access and mobility management function (AMF) unit or a similar function unit. The second network device 1100 includes a processor 1101 and a memory 1102. The memory 1102 may be a memory (memory #3) independent of the processor or the network device, or may be a memory (memory #1 or memory #2) inside the processor or the network device. The memory 1102 may be a physically independent unit, or may be storage space, a network hard disk, or the like on a cloud server.

The memory 1102 is configured to store one or more computer-readable instructions (or referred to as a computer program).

The processor 1101 is configured to read the one or more computer-readable instructions to implement the method provided in any one of the foregoing aspects related to the second network device and the implementations thereof.

Optionally, the memory 1102 (memory #1) is located in the apparatus.

Optionally, the memory 1002 (memory #2) is integrated with the processor.

Optionally, the memory 1002 (memory #3) is located outside the apparatus.

Optionally, the second network device further includes a transceiver 1103, configured to receive and send data.

In addition, the processor 1001 or 1101 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors or a combination of a digital signal processor and a microprocessor. In addition, the memory 1002 or 1102 may include a volatile memory, for example, a random access memory (RAM). The memory may alternatively include a non-volatile memory, for example, a flash memory, a hard disk drive (HDD), a solid-state drive (SSD), a cloud storage, a network attached storage (NAS), or a network drive. The memory may alternatively include a combination of memories of the foregoing types, or another medium or product in any form that has a storage function.

An embodiment of this application further provides a coordinated satellite communications system. The satellite communications system includes a ground station, a first network device, and a second network device. The first network device is the first network device described in the embodiment corresponding to FIG. 7. The second network device is the second network device described in the embodiment corresponding to FIG. 8. The ground station is usually a ground device that is disposed on the earth's surface (including being disposed on a ship or an airplane) to perform artificial satellite communication, and is mainly responsible for forwarding signaling and data between a satellite base station and a core network. The first network device may be a device with a user plane function (UPF) unit or a similar function unit, and the second network device may be a device with an access and mobility management function (AMF) unit or a similar function unit.

An embodiment of this application further provides a coordinated satellite communications system. The satellite communications system includes a ground station, a first network device, and a second network device. The first network device is the first network device described in the embodiment corresponding to FIG. 10. The second network device is the second network device described in the embodiment corresponding to FIG. 11. The ground station is usually a ground device that is disposed on the earth's surface (including being disposed on a ship or an airplane) to perform artificial satellite communication, and is mainly responsible for forwarding signaling and data between a satellite base station and a core network. The first network device may be a device with a user plane function (UPF) unit or a similar function unit, and the second network device may be a device with an access and mobility management function (AMF) unit or a similar function unit.

An embodiment of this application further provides a computer-readable medium. The computer-readable medium stores one or more computer program instructions. When the one or more computer program instructions are executed by a computer, the method in any one of the foregoing embodiments is implemented.

An embodiment of this application further provides a computer program product. When the computer program product is executed by a computer, the method in any one of the foregoing embodiments is implemented.

A person of ordinary skill in the art may be aware that units, algorithms, and steps in the examples described with reference to the embodiments disclosed in this specification can be implemented by electronic hardware or a combination of computer software and electronic hardware. Whether the functions are performed by hardware or software depends on particular applications and design constraints of the technical solutions. A person of ordinary skill in the art may use different methods to implement the described functions for each particular application, but it should not be considered that such an implementation goes beyond the scope of this application.

A person of ordinary skill in the art may clearly understand that, for the purpose of convenient and brief description, for a detailed working process of the system and apparatus described above, refer to a corresponding process in the foregoing method embodiments.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application.

The foregoing descriptions are merely non-limiting examples of specific implementations and are not intended to limit the protection scope, which is intended to cover any variation or replacement determined by a person of ordinary skill in the art. Therefore, the claims shall define the protection scope.

What is claimed is:

1. A satellite communication method, comprising:
    obtaining, by a first network device, traffics of a plurality of satellite communications links, or obtaining air interface resources allocated by a ground station to a plurality of satellite base stations; and
    sending, by the first network device, identification information to a second network device, wherein the identification information indicates that a traffic of a satellite communications link reaches a traffic threshold, or that an air interface resource allocated by the ground station to a satellite base station reaches a resource threshold.

2. The satellite communication method according to claim 1, wherein
    the identifier information further indicates a cell corresponding to the satellite communications link whose traffic reaches the traffic threshold, or a cell corresponding to the satellite base station whose air interface resource allocated by the ground station reaches the resource threshold.

3. The satellite communication method according to claim 1, further comprising:
    sending, by the first network device, a first cell identifier to the second network device, wherein the first cell identifier is determined based on the satellite communications link whose traffic reaches the traffic threshold, or is determined by the satellite base station whose air interface resource allocated by the ground station reaches the resource threshold.

4. The satellite communication method according to claim 1, further comprising:
sending, by the first network device, a second cell identifier and load information to the second network device, wherein the second cell identifier is determined based on a satellite communications link whose traffic does not reach the traffic threshold, or is determined by a satellite base station whose air interface resource allocated by the ground station does not reach the resource threshold; and the load information indicates the traffic of the satellite communications link whose traffic does not reach the traffic threshold, or indicates the air interface resource allocated to the satellite base station whose air interface resource does not reach the resource threshold.

5. The satellite communication method according to claim 1, further comprising:
sending, by the first network device, a second cell identifier and load information to the second network device, wherein the second cell identifier is determined based on a satellite ephemeris, and the load information is determined by a satellite base station corresponding to the satellite ephemeris.

6. A satellite communication method, comprising:
receiving, by a second network device, a first message sent by a first network device, wherein the first message comprises identification information, and the identification information indicates that a traffic of a satellite communications link reaches a traffic threshold, or that an air interface resource allocated by a ground station to a satellite base station reaches a resource threshold;
determining, by the second network device, a to-be-linked satellite base station based on the first message, wherein the to-be-linked satellite base station has an idle satellite resource; and
sending, by the second network device, a second message to the to-be-linked satellite base station, wherein the second message comprises information about a generated beam of the to-be-linked satellite base station.

7. The satellite communication method according to claim 6, wherein the first message further comprises a second cell identifier and load information, the second cell identifier indicates a satellite base station around a satellite whose traffic reaches the traffic threshold, and the load information indicates a traffic of a satellite communications link that is in the second cell identifier and whose traffic does not reach the traffic threshold, or indicates an air interface resource allocated to a satellite base station that is in the second cell identifier and whose air interface resource does not reach the resource threshold.

8. The satellite communication method according to claim 7, wherein
the identification information further indicates a cell corresponding to the satellite communications link whose traffic reaches the traffic threshold, or a cell corresponding to the satellite base station whose air interface resource allocated by the ground station reaches the resource threshold.

9. The satellite communication method according to claim 7, wherein
the first message comprises a first cell identifier, and the first cell identifier is determined based on the satellite communications link whose traffic reaches the traffic threshold, or is determined by the satellite base station whose air interface resource allocated by the ground station reaches the resource threshold.

10. The satellite communication method according to claim 7, wherein
the second cell identifier is determined based on the satellite communications link whose traffic does not reach the traffic threshold, or is determined by the satellite base station whose air interface resource allocated by the ground station does not reach the resource threshold.

11. The satellite communication method according to claim 7, wherein
the second cell identifier is determined based on a satellite ephemeris, and the load information is determined by a satellite base station corresponding to the satellite ephemeris.

12. A first network device, comprising:
a monitor, configured to: obtain traffics of a plurality of satellite communications links, or obtain air interface resources allocated by a ground station to a plurality of satellite base stations; and
a transmitter, configured to send identification information to a second network device, wherein the identification information indicates that a traffic of a satellite communications link reaches a traffic threshold, or that an air interface resource allocated by the ground station to a satellite base station reaches a resource threshold.

13. The first network device according to claim 12, wherein
the identification information further indicates a cell corresponding to the satellite communications link whose traffic reaches the traffic threshold, or a cell corresponding to the satellite base station whose air interface resource allocated by the ground station reaches the resource threshold.

14. The first network device according to claim 12, wherein
the transmitter is further configured to send a first cell identifier to the second network device, wherein the first cell identifier is determined based on the satellite communications link whose traffic reaches the traffic threshold, or is determined by the satellite base station whose air interface resource allocated by the ground station reaches the resource threshold.

15. The first network device according to claim 12, wherein
the transmitter is further configured to send a second cell identifier and load information to the second network device, wherein the second cell identifier is determined based on a satellite communications link whose traffic does not reach the traffic threshold, or is determined by a satellite base station whose air interface resource allocated by the ground station does not reach the resource threshold; and the load information indicates the traffic of the satellite communications link whose traffic does not reach the traffic threshold, or indicates the air interface resource allocated to the satellite base station whose air interface resource does not reach the resource threshold.

16. The first network device according to claim 12, wherein
the transmitter is further configured to send a second cell identifier and load information to the second network device, wherein the second cell identifier is determined based on a satellite ephemeris, and the load information is determined by a satellite base station corresponding to the satellite ephemeris.

* * * * *